(12) United States Patent
Srivastava et al.

(10) Patent No.: US 10,467,696 B1
(45) Date of Patent: Nov. 5, 2019

(54) TIMING MECHANISMS TO ENHANCE THE SECURITY OF ONLINE NETWORKS

(71) Applicant: INTEGRAL DEVELOPMENT CORP., Palo Alto, CA (US)

(72) Inventors: Vikas Srivastava, Palo Alto, CA (US); Udyan Kumar, Palo Alto, CA (US); Chia-Hwei Anni Chen Liu, San Mateo, CA (US); Nitin Seth, Union City, CA (US)

(73) Assignee: INTEGRAL DEVELOPMENT CORP., Palo Alto, CA (US)

( * ) Notice: Subject to any disclaimer, the term of this patent is extended or adjusted under 35 U.S.C. 154(b) by 648 days.

(21) Appl. No.: 15/224,425

(22) Filed: Jul. 29, 2016

Related U.S. Application Data

(60) Provisional application No. 62/199,883, filed on Jul. 31, 2015.

(51) Int. Cl.
　　*G06Q 40/04*　　(2012.01)
(52) U.S. Cl.
　　CPC .................. *G06Q 40/04* (2013.01)
(58) Field of Classification Search
　　CPC .................................................. G06Q 40/04
　　USPC .......................................................... 705/37
　　See application file for complete search history.

(56) References Cited

U.S. PATENT DOCUMENTS 6,347,307 B1　2/2002　Sandhu et al.
7,433,837 B2 *　10/2008　Dawson .............. G06Q 40/00
　　　　　　　　　　　　　　　　　　　705/35
7,437,519 B2 *　10/2008　Kiyota ................. G06F 9/3004
　　　　　　　　　　　　　　　　　　　711/141
7,716,118 B2 *　5/2010　Bartko ................. G06Q 40/04
　　　　　　　　　　　　　　　　　　　705/35
7,882,011 B2 *　2/2011　Sandhu ............... G06Q 30/02
　　　　　　　　　　　　　　　　　　　705/35

(Continued)

FOREIGN PATENT DOCUMENTS

EP　　　　1363223 A1 *　11/2003　........... G06Q 20/381
WO　WO-2014055130 A1 *　4/2014

OTHER PUBLICATIONS

Stonr, Gary: Why is Mid-Point a "Fairer" Price?, May 22, 2014, Bloomberg.com, pp. 1-9. (Year: 2014).*

(Continued)

*Primary Examiner* — Bijendra K Shrestha
(74) *Attorney, Agent, or Firm* — Artegis Law Group, LLP

(57) ABSTRACT

Disclosed embodiments provide a computing system configured to match a set of transactions associated with an online trading system. The computing system includes a memory that includes a client service engine, a price update event engine, and a match processing engine. The computing system further includes a processor coupled to the memory. When executing the client service engine, the processor is configured to receive, from one or more client devices, a plurality of order requests during a first interval of configurable duration. When executing the price update event engine, the processor is configured to set a plurality of mid-rate prices corresponding to the first interval. When executing the match processing engine, the processor is configured to determine that the first interval has expired, and in response, match a first order request included in the plurality of order requests with a second order request included in the plurality of order requests.

19 Claims, 9 Drawing Sheets

(56) References Cited

U.S. PATENT DOCUMENTS

| | | | |
|---|---|---|---|
| 8,380,612 B2* | 2/2013 | Hanson | G06Q 20/10 705/36 R |
| 8,417,622 B2 | 4/2013 | Sandhu et al. | |
| 8,566,218 B2* | 10/2013 | Czupek | G06Q 40/04 705/35 |
| 8,977,565 B2* | 3/2015 | Alderucci | G06Q 40/06 705/35 |
| 9,961,034 B2* | 5/2018 | Hopkins | H04L 51/26 |
| 2004/0236662 A1* | 11/2004 | Korhammer | G06Q 40/04 705/37 |
| 2009/0055305 A1* | 2/2009 | Hirani | G06Q 40/04 705/37 |
| 2010/0268638 A1* | 10/2010 | Wunsch | G06Q 30/0633 705/37 |
| 2012/0131596 A1* | 5/2012 | Lefebvre | G06F 9/52 718/106 |
| 2012/0143743 A1* | 6/2012 | Cicero | G06Q 40/04 705/37 |
| 2012/0221134 A1* | 8/2012 | Sasagawa | G06F 11/2038 700/94 |
| 2014/0101017 A1* | 4/2014 | Mintz | G06Q 40/04 705/37 |
| 2015/0302441 A1* | 10/2015 | Katsuyama | G06Q 30/0206 705/7.35 |
| 2016/0042456 A1* | 2/2016 | McKenzie | G06Q 40/02 705/37 |
| 2016/0292077 A1* | 10/2016 | Khosla | G06F 12/0891 |
| 2017/0004576 A1* | 1/2017 | Cicero | G06Q 40/04 |

OTHER PUBLICATIONS

Thompson et al.: Disruptor: High performance alternative to bounded queues for exchanging data between concurrent threads, May 2011, LMAX, pp. 1-11. (Year: 2011).*

Kapoor et al.: Chronos: Predictable Low Latency for Data Center Applications, Oct. 14-17, 2012, SOCC'12: University of California, San Jose, CA, pp. 1-14. (Year: 2012).*

Cisco: Understanding and Tunning Spanning Tree Protocol Timers, Jan. 30, 2006, pp. 1-9. (Year: 2006).* http://www.apache.org, Apr. 2, 2017.

* cited by examiner

TIMING MECHANISMS TO ENHANCE THE SECURITY OF ONLINE NETWORKS

CROSS-REFERENCE TO RELATED APPLICATIONS

This application claims the benefit of United States provisional patent application titled, "RISKNET: A SET OF DISTRIBUTED COMMUNITY-BASED EXCHANGES FOR DIFFERENT SECURITY OR FINANCIAL INSTRUMENTS," filed on Jul. 31, 2015 and having Ser. No. 62/199,883. The subject matter of this related application is hereby incorporated herein by reference.

BACKGROUND OF THE INVENTION

Field of the Invention

Embodiments of the present invention relate generally to computer networks and, more specifically, to timing mechanisms to enhance the security of online networks.

Description of the Related Art

Currently, different types of computer-based systems exist to facilitate online transactions for securities and other financial instruments over a communications network as well as other electronic-based financial transactions. These systems are referred to herein as "online trading systems." Typically, with such online trading systems, certain online traders, referred to herein as "authorized market makers," are authorized by the online trading system to agree to facilitate trading of those securities and instruments. Authorized market makers typically hold some volumes of specified securities and other instruments and agree to immediately buy and sell their holdings with other traders who themselves have interest to buy or sell their holdings on the online trading system, and then the authorized market makers may make offsetting trades elsewhere in the market to maintain their level of holdings. Authorized market makers continuously publish bid, or buy, prices and somewhat higher ask, or sell, prices to publicize their level of interest to buy or sell. In so doing, authorized market makers provide continuous trading liquidity to the online trading system and assume a portion of the market risk of holding some volumes of these instruments. In return, market makers are compensated by the difference between the bid and ask prices, known as the spread.

One drawback of such authorized market maker-based online trading systems is that other traders are disadvantaged by having to buy at a higher price and sell at a lower price. The bid-ask spread essentially operates as an extra fee that other traders pay in order to trade with authorized market makers. Further, because other traders are either unable or unwilling to continuously publish bid or ask prices or continuously publicize their interest to buy or sell, these other traders are thus unable to be compensated for the momentary trading liquidity that they provide to the online trading system. Also, the bid-ask spread is typically higher as a percentage of the trade size for larger transactions, so other traders who are able to contribute large, momentary trading liquidity to the online trading system are not only prevented from being compensated for doing so, but must actually pay more for contributing such liquidity. Finally, larger trades have a more significant effect on the market than do smaller trades, since authorized market makers who offset trades elsewhere in the market may result in information leakage regarding the size and direction of the originating large trade, thus resulting in market trades at less favorable bid and ask prices for both the authorized market maker and the other traders. Other traders are therefore incented to find an alternative to online trading systems which not only do not compensate such traders for contributing momentary liquidity to the system, but instead disadvantages them for doing so.

One potential solution to these drawbacks is for traders to participate privately on an online trading system that has no authorized market makers and no published bid or ask prices. Such an online trading system is known as a "dark pool" system. On dark pool systems, a machine within the system electronically sets the trading price for a given instrument. The trading price is set between the bid and ask prices that are published for that instrument by machines associated with other online systems and market reporting services. Typically, the dark pool system receives such bid and ask prices from the other online systems and market reporting services over a communications network.

When the dark pool system electronically receives an order request from a client device, the dark pool system immediately attempts to electronically match the order request against one or more previously received offsetting order requests. If such offsetting order requests are available, then the dark pool system immediately matches the offsetting order requests electronically. Otherwise, the dark pool system stores the order request in memory until offsetting order requests are subsequently received. Because all traders buy and sell at the trading price set by the dark pool system, the bid-ask spread typical of an authorized market maker-based online trading systems is eliminated. Further, all traders who contribute momentary liquidity (in the form of an order request into the dark pool system) benefit from doing so because the trading prices is set between the bid and ask prices for the trade instruments. Thus, buyers can buy at a lower price than the typical ask price, and sellers can sell at a higher price than the typical bid price.

One drawback of dark pool systems and the fact that electronic matching occurs immediately when orders are placed is that a sophisticated trader, such as a high-frequency trader (HFT) can engage in abusive behavior by "gaming" dark pool systems, that is, to participate in dark pools not because they have an pre-existing interest to buy or sell, but rather to draw out information about other traders' interests and formulate a reactive interest to buy or sell. In one example, an HFT trader can act as both a participant in a dark pool and also an authorized market maker in another online system. The HFT trader could electronically place a small order request, such as a sell order request for 100 shares of company XYZ, on a dark pool system to test for interest and liquidity. If the small order is immediately matched by the dark pool system, the HFT trader can deduce that there is a larger opposing interest in the dark pool system, which would be the buy side in this example. The HFT trader could then act as an authorized market maker in the open market and increase the bid, or buy, price, for shares of company XYZ in an attempt to manipulate the market by temporally driving up the market price of company XYZ shares. The dark pool system would receive network messages that the share price has increased and, correspondingly, would update a higher trading price for company XYZ in the dark pool. The trader could electronically place a larger sell order request in the dark pool, such as a sell order request for 10,000 shares of company XYZ, knowing that the order request can be offset against the existing buy order interest at the artificially elevated trading price. As a result, the HFT trader receives an unfair benefit by electronically selling shares at an artificially inflated price. After the sell order is executed in the dark pool, the bid in the open market is cancelled, and the "gaming" process can begin again.

One approach for addressing the problem of bad actors gaming dark pool systems is to implement network security mechanisms that attempt to identify the institutions that are submitting abusive order requests and analyze electronically received order requests for suspicious multiple consecutive trades for the same company. If such abusive users or suspicious trades are identified, the network security mechanisms can attempt to cancel the corresponding order requests in an attempt to filter bad actors and abusive order requests out of the dark pool systems.

However, one problem with these network security approaches is that users and trades that appear to be suspicious may, in fact, be associated with legitimate trading activity. As a result, conventional network security mechanisms run a substantial risk of filtering out good actors, thereby preventing legitimate electronic traders from participating and contributing trading liquidity in the dark pool system. This risk is particularly high for dark pool systems that process a large number of order requests, which can process thousands of transactions every second. In such cases, network security mechanisms may not have adequate time to analyze the order requests accurately and make proper decisions about which orders to filter, thereby increasing the likelihood of mistakes.

As the foregoing illustrates, what is needed in the art are more effective electronic mechanisms for ensuring legitimate activity on online computer networks.

SUMMARY OF THE INVENTION

Various embodiments of the present invention set forth a computing system configured to match a set of transactions associated with an online trading system. The computing system includes a memory that includes a client service engine, a price update event engine, and a match processing engine. The computing system further includes a processor coupled to the memory. When executing the client service engine, the processor is configured to receive, from one or more client devices, a plurality of order requests during a first interval of configurable duration. When executing the price update event engine, the processor is configured to set a plurality of mid-rate prices corresponding to the first interval. When executing the match processing engine, the processor is configured to determine that the first interval has expired, and in response, match a first order request included in the plurality of order requests with a second order request included in the plurality of order requests.

Other embodiments include, without limitation, a computer-readable storage medium that includes instructions that enable a processor to implement one or more aspects of the disclosed approaches as well as a method for performing one or more aspects of the disclosed approaches.

At least one advantage of the disclosed techniques is that orders are matched in an efficient reliable manner at regularly timed matching intervals. Because each matching interval is independent, with separately set mid-rates, the likelihood that a sophisticated trader can game the system is reduced relative to prior approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
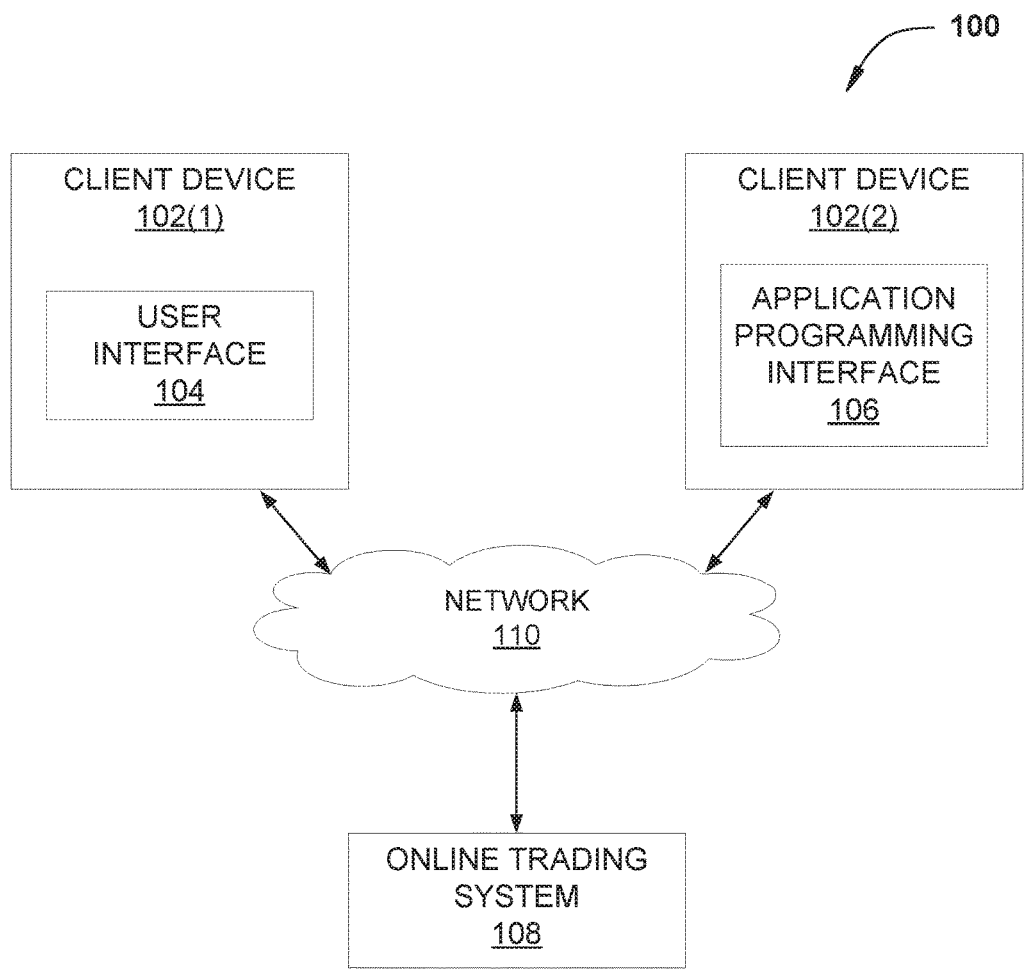
FIG. 1 is a block diagram illustrating an exemplary distributed computing system configured to implement one or more aspects of the present invention.

FIG. 1 is a block diagram illustrating an exemplary distributed computing system 100 configured to implement one or more aspects of the present invention. As shown, the distributed computing system 100 includes, without limitation, client devices 102(1) and 102(2) connected to an online trading system 108 via a network 110. The network 110 may be any suitable environment to enable communications among remote or local computer systems, including, without limitation, cross connect systems within a data center, dedicated low-latency networks, LANs (Local Area Networks), and internet-based WANs (Wide Area Networks).

Client device 102(1) includes a user interface (UI) 104 through which a user enters information directed to online trading system 108 and displays information received from online trading system 108. In some embodiments, UI 104 is employed via a web browser or other application (not explicitly shown). In various embodiments, the UI may employ any technically feasible protocol, including, without limitation, JavaScript object notation (JSON), hypertext markup language (HTML), extensible markup language (XML), and proprietary binary formats. Client device 102(1) receives input data via UI 104, packages the input data into one or more network messages, and transmits the one or more messages to online trading system 108 via network 110. Likewise, client device 102(1) receives one or more network messages, where the network messages include output data transmitted by online trading system 108 and directed to client device 102(1). In response, client device 102(1) displays the output data via UI 104.

Similarly, client device 102(2) includes an applications programming interface (API) 106 through which a software application (not explicitly shown) exchanges information with online trading system 108. One such exemplary API is the OCX RiskNet API, published by Integral Development Corporation, which is based on the Financial Information eXchange (FIX) protocol. Client device 102(2) receives input data from the program application via API 106, packages the input data into one or more network messages, and transmits the one or more messages to online trading system 108 via network 110. Likewise, client device 102(2) receives one or more network messages, where the network messages include output data transmitted by online trading system 108 and directed to client device 102(2). In response, client device 102(2) transmits the output data to the software application via API 106.

Although only two exemplary client devices 102(1) and 102(2) are illustrated in FIG. 1, any number of client devices, each including at least one of a UI and an API, may communicate with online trading system 108 via network 110 within the scope of the present invention.

Online trading system 108 is a hardware system that includes various engines and modules configured to perform the disclosed techniques. Online trading system 108 performs these techniques rapidly in order to provide actionable information to a trader that allows the trade to complete a portfolio of trades at reduced cost and market exposure relative to prior techniques. In order to achieve this result, Online trading system 108 performs these techniques sufficiently rapidly and at regular intervals so as to fairly transact order requests and reduce the likelihood that one or more traders can game the online trading system 108. Online trading system 108 receives a portfolio of trades from one or more client devices, such as client devices 102(1) and 102(2).

The online trading system 108 determines which trades in the portfolio of trades received from the client devices 102(1) and 102(2) can be netted against other trades in the portfolio of trades. The online trading system 108 then nets trades against each other across multiple portfolios received from multiple client devices. The online trading system 108 may also executed non-netted trades, including, without limitation, market orders and limit orders. In some embodiments, the distributed computing system 100 includes two or more online trading system 108, each of which communicates with one or more client devices 102 over the communications network 110. The online trading system 108 is now described in further detail.

Figure 2:
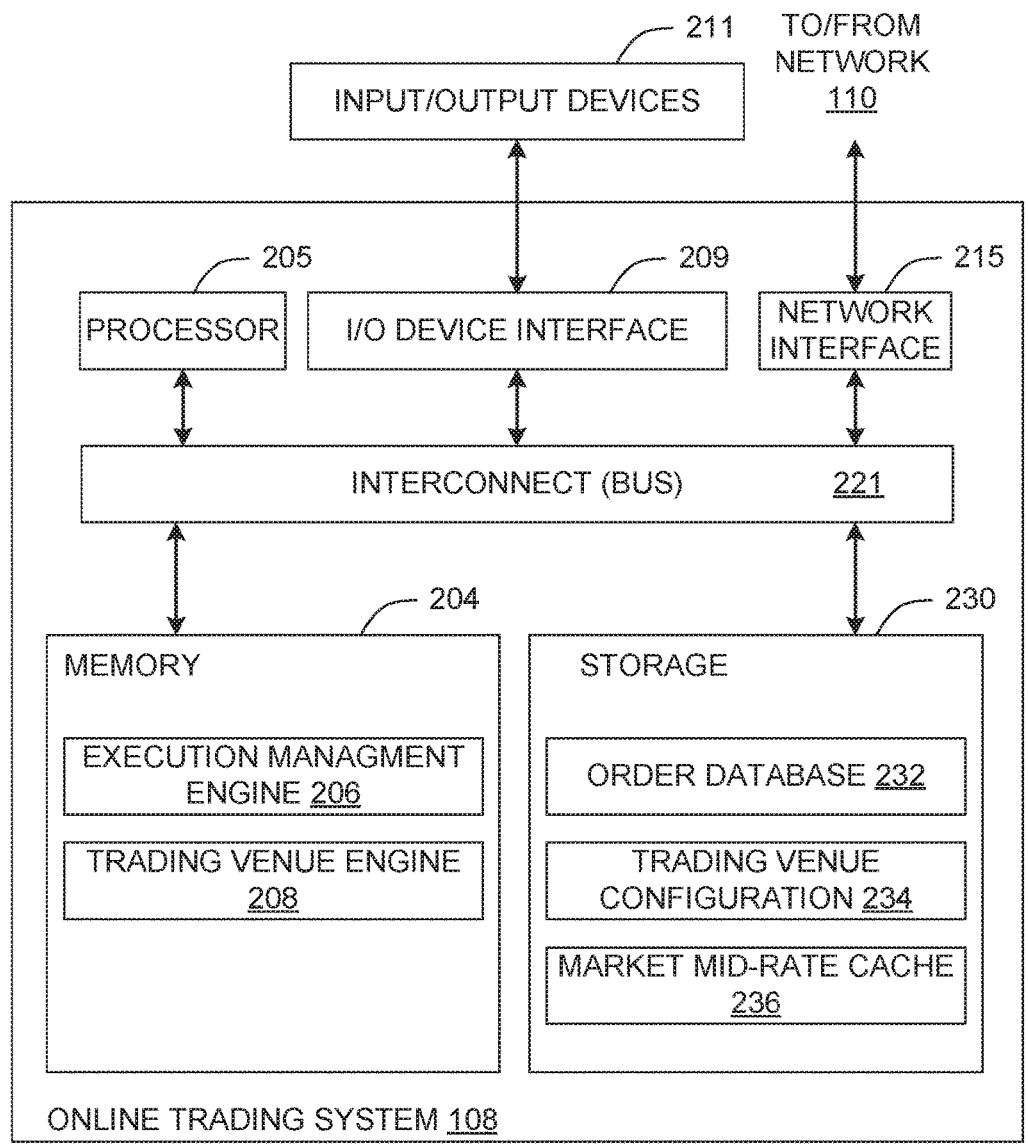
FIG. 2 is a more detailed illustration of the online trading system of FIG. 1, according to various embodiments of the present invention.

FIG. 2 is a more detailed illustration of the online trading system 108 of FIG. 1, according to various embodiments of the present invention. As shown, the online trading system 108 includes, without limitation, a processor 205, a network interface 215, an interconnect (bus) 220, a memory 204, and a storage 230. The online trading system 108 may also include an input/output (I/O) device interface 209 connecting user input/output devices 211 (e.g., keyboard, display and mouse devices) to the online trading system 108.

In general, processor 205 retrieves and executes programming instructions stored in the memory 204. Processor 205 may be any technically feasible form of processing device configured to process data and execute program code. Processor 205 could be, for example, a central processing unit (CPU), a graphics processing unit (GPU), an application-specific integrated circuit (ASIC), a field-programmable gate array (FPGA), and so forth. Processor 205 stores and retrieves application data residing in the memory 204. Processor 205 includes one or more processing cores. In operation, processor 205 is the master processor of online trading system 108, controlling and coordinating operations of other system components. System memory 204 stores software applications and data for use by processor 205. Processor 205 executes software applications stored within system memory 204 and optionally an operating system. In particular, processor 205 executes software and then performs one or more of the functions and operations set forth in the present application. The storage 230 provides non-volatile storage for applications and data and may include any combination of fixed or removable hard disk drives, flash memory devices, and CD-ROM, DVD-ROM, Blu-ray, HD-DVD, or other magnetic, optical, or solid state storage devices. Although shown as a single unit, the storage 230 may be a combination of fixed and/or removable storage devices, such as, without limitation, solid state device (SSD) systems, fixed disc drives, floppy disc drives, tape drives, removable memory cards, optical storage, network attached storage (NAS), or a storage area-network (SAN).

Illustratively, the memory 204 includes an execution management engine 206 and a trading venue engine 208. The execution management engine 206 receives and executes standard order requests received from client devices 120(1) and 102(2). For certain algorithmic order requests, the execution management engine 206 forwards the order requests to the trading venue engine 208 for interval-based matching. The trading venue engine 208 schedules batches of order request for matching during regularly scheduled matching intervals. The trading venue engine 208 matches orders for all order books that are open, or enabled, and have a valid mid-rate, where each order book corresponds to a particular instrument for a particular trading venue. As further described herein, mid-rates are sourced from a primary price update event engine and a secondary price update event engine, for redundancy purposes. If neither the primary price update event engine nor the secondary price update event engine have a valid mid-rate for a particular instrument, then venues with outstanding order requests for that instrument suspends order matching for at least the current matching interval. In some embodiments, each matching interval may be 100 milliseconds and the mid-rates are also updated every 100 milliseconds. In some embodiments, the duration of the matching interval and the update rate of the mid-rates are individually configurable and may differ from each other.

Further, the trading venue engine 208 may open, or enable, individual order books and may close, or disable, individual order books for various reasons. In one example, a particular order book could be open for trading certain time periods, such as 9:00 AM to 4:00 PM Eastern time, Monday through Friday. The trading venue engine 208 would open the order book during these time periods and close the order book outside these time periods. In another example, a system administrator monitoring the activities of the trading venue engine 208 could detect anomalies occurring in a particular order book, such as large changes in the price or trading volume of the particular order book. In such cases, the administrator could manually close the order book until the source of the anomaly is determined and any needed corrective action is taken. In yet another example, a risk management engine (not explicitly shown) could electronically monitor the activities of the trading venue engine 208 to detect anomalies occurring in a particular order book, such as large changes in the price or trading volume of the particular order book or when the order book fails to have a valid mid-rate for a threshold number of matching intervals. In such cases, the risk management engine could automatically close the order book and report the closing of the order book. A system administrator could then take any needed corrective actions and open the order book. In yet another example, the trading venue engine 208 could monitor activities of a particular order book based on two time thresholds. The first threshold could be a relatively short period of time, such as twenty seconds, and the second threshold could be a relatively long period of time, such as five minutes. If no mid-rate update for the relevant instrument has been received for the first threshold period of time, then the trading venue engine 208 could suspend trading in the order book for each matching interval until a valid pricing update for the instrument is received. In such cases, the trading venue engine 208 would keep the order book open and continue to receive order requests for the order book. If no mid-rate update for the relevant instrument has been received for the second threshold period of time, then the trading venue engine 208 would close the order book and stop receiving order requests for the order book.

The trading venue engine 208 reports all order requests that have been matched, along with order requests that have been partially matched, or filled. For any unfilled portion of an order request, the trading venue engine 208 either reschedules or cancels the order request based on the parameters of the order request. The storage 230 includes an order database 232, a trading venue configuration 234, and a market mid-rate cache 236. In general, the order database 232 includes information associated with received order requests. Trading venue configuration 234 includes information on which venues are open or enabled, which venues are closed or disabled, requirements specific to each venue, and summary data and metrics for orders filled by the trading venue engine 208. The market mid-rate cache 236 includes mid-rates for the various trading instruments that are matched by the trading venue engine 208.

The execution management engine 206 and the trading venue engine 208 are described in further detail below.

Figure 3:
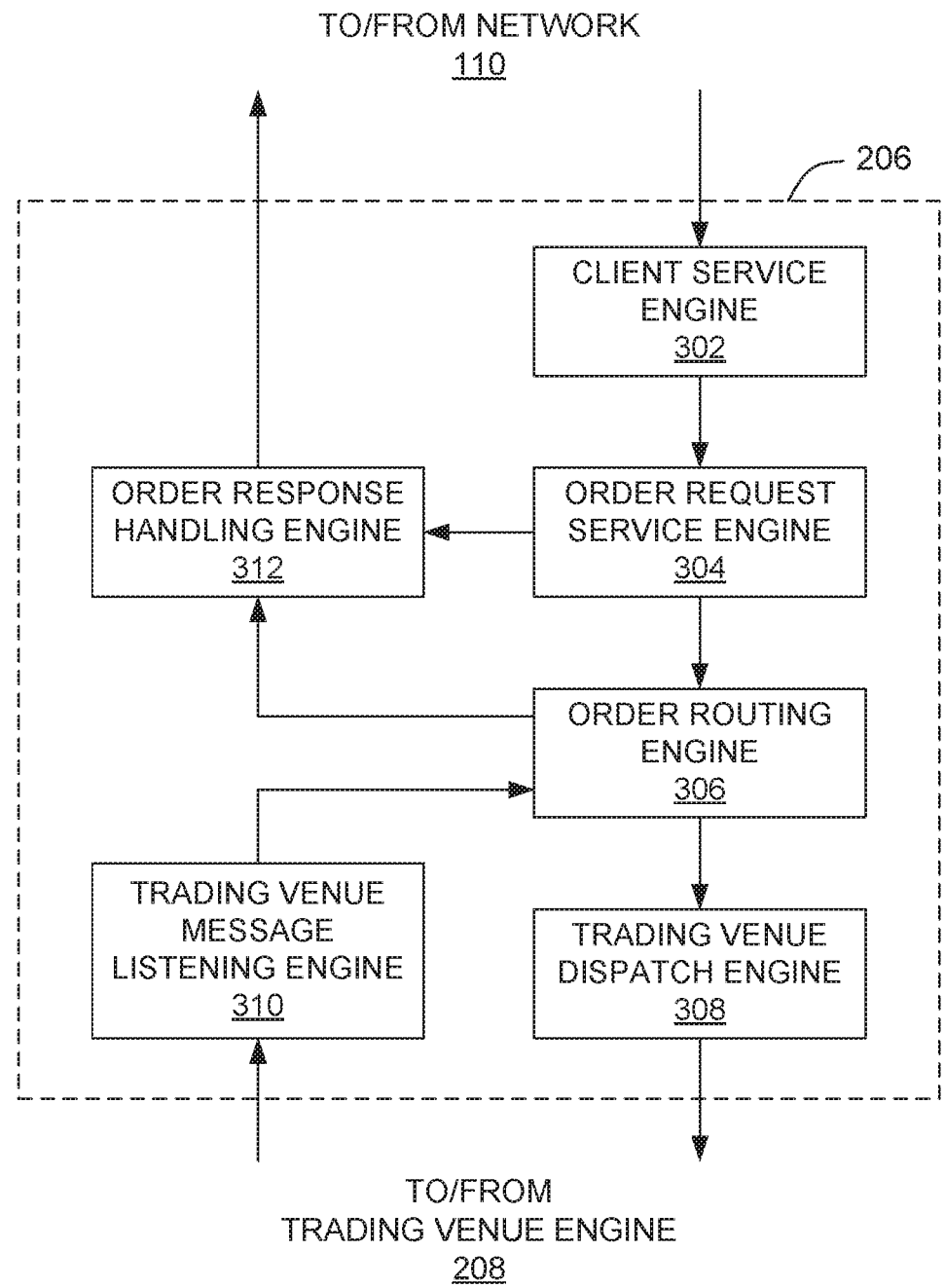
FIG. 3 is a more detailed illustration of the execution management engine of FIG. 2, according to various embodiments of the present invention.

FIG. 3 is a more detailed illustration of the execution management engine 206 of FIG. 2, according to various embodiments of the present invention. The execution management engine 206 includes, without limitation, a client service engine 302, an order request service engine 304, and order routing engine 306, a trading venue dispatch engine 308, a trading venue message listening engine 310, and an order response handling engine 312.

The client service engine 302 receives order requests from client devices 102(1) and 101(2). The client service engine 302 decodes the order requests according to the particular UI or API rules associated with the order request and extracts input parameters for each received order requests. The input parameters may include, without limitation, an order type, a strategy, a symbol, an order amount, a "no worse than" price, a time in force, and an action on venue expiry. The order type specifies whether the order is a standard order, such as a market order or limit order, or an algorithmic, or algo, order. The order type also indicates whether the order request is for a buy order or a sell order. Standard orders are executed within the execution management system 206 and are not placed with the trading venue engine 208. Order requests that are to be placed to a venue via the trading venue engine 208 are designated as algo orders. The strategy designates additional details about the algo order request, for example, specifying the venue to which the order request is sent. The symbol indicates the instrument to be traded, such as a particular stock, bond, or foreign currency exchange pair. Order amount indicates that number of shares or units of the instrument to be traded. The "no worse than" price (NWTP) indicates the lowest per-unit value that a sell order is to be executed or the highest per-unit value that a buy order is to be executed.

The time in force designates the amount of time that the order request is to be placed in the venue. The time in force may be specified as a quantity of scheduled venue intervals, a duration of time, or a fixed ending time. For example, an order request with a time in force of one venue interval is placed with the trading venue engine 208 for one scheduled interval. If some or all of the order requests is not matched in the trading venue engine 208 within the specified time in force, the unmatched portion of the order request is returned from the trading venue engine 208 to the execution management system 206 for further processing. The action on venue expiry specifies the action to take if at least some portion of the order request is not matched within the venue engine. For example, the action on venue expiry could specify that the unmatched portion of the order request is executed by the execution management system 206 as a standard order, such as a market order or a limit order. Alternatively, the action on venue expiry could specify that the unmatched portion of the order request is returned back to the originating client device 102 as unfilled.

The order request service engine 304 processes orders received by the client service engine 302. The order request service engine 304 validates the received order requests by analyzing the order request to ensure that the order request is properly formatted and includes the minimum required input parameters. The order request service engine 304 further validates the order request against venue requirements for a particular venue, including, without limitation, whether the user has permission to place orders with the trading venue engine 208, whether the trading venue engine 208 supports the instrument specified by the order request, and whether the venue associated with the order request is open or closed. The order request service engine 304 rejects order requests that are found to be invalid. If an order request is valid, the order request service engine 304 adds additional parameters to the order, such as user name and user organization. The order request service engine 304 then transmits valid order requests to the order routing engine 306 for further processing.

The order routing engine 306 prepares order requests for execution. If the order is a standard order, then the order routing engine 306 executes the order without transmitting the order to the trading venue engine 208. If the order is to be placed with the venue engine, the order routing engine 306 marks the order as inactive, in order to avoid executing the order within the execution management engine 206. The order routing engine 306 places such orders to the trading venue dispatch engine 308. The order routing engine 306 receives status regarding order requests placed with venues via the trading venue message listening engine 310. For orders that are partially or fully unmatched by the trading venue engine 208, the order routing engine 306 executes the unmatched portion of the order request according to the action on venue expiry parameter, if specified. The order routing engine 306 prepares an acknowledgment to send to the originating client device 102 based on whether all, some, or none of the order request was filled, along with information specifying how the order request was filled.

The trading venue dispatch engine 308 receives order requests from the order routing engine 306. To ensure fast efficient communications with the trading venue engine 208, the trading venue dispatch engine 308 reformats the received order requests by removing parameters that are not needed by the trading venue engine 208. The trading venue dispatch engine 308 encodes the remaining parameters in an efficient binary format by, for example, converting parameters expressed as strings into a numeric value. The trading venue dispatch engine 308 transmits the reformatted order requests to the trading venue engine 208. In some embodiments, the trading venue dispatch engine 308 communicates with the trading venue engine 208 via a connection/socket based protocol, such as transport control protocol (TCP). In some embodiments, the trading venue dispatch engine 308 communicates with the trading venue engine 208 via a connectionless protocol, such as user datagram (UDP).

The trading venue message listening engine 310 receives status information regarding order requests from the trading venue engine 208. This status information includes information as to whether an order request was completely filled, partially filled, or unfilled by the trading venue engine 208, along with additional data such as the price at which the order was filled. The trading venue message listening engine 310 forwards the status information to the order routing engine 306 for further processing.

The order response handling engine 312 receives status information regarding order requests from the order routing engine 306. The status information includes, without limitation, whether the order request filled or partially filled, which part of an order request not filled, whether the order request was filled within the trading venue engine 208, the execution management engine 206, or both, and the price at which various portions of the order was filled. The order response handling engine 312 also receives status information regarding order requests that are found to be invalid. Based on the received status information, the order response handling engine 312 formats acknowledgements and rejection messages according to the UI or API rules employed by the corresponding client devices 102(1) and 102(2). The order response handling engine 312 then transmits the formatted acknowledgements and rejection messages to the corresponding client devices 102(1) and 102(2).

Figure 4:
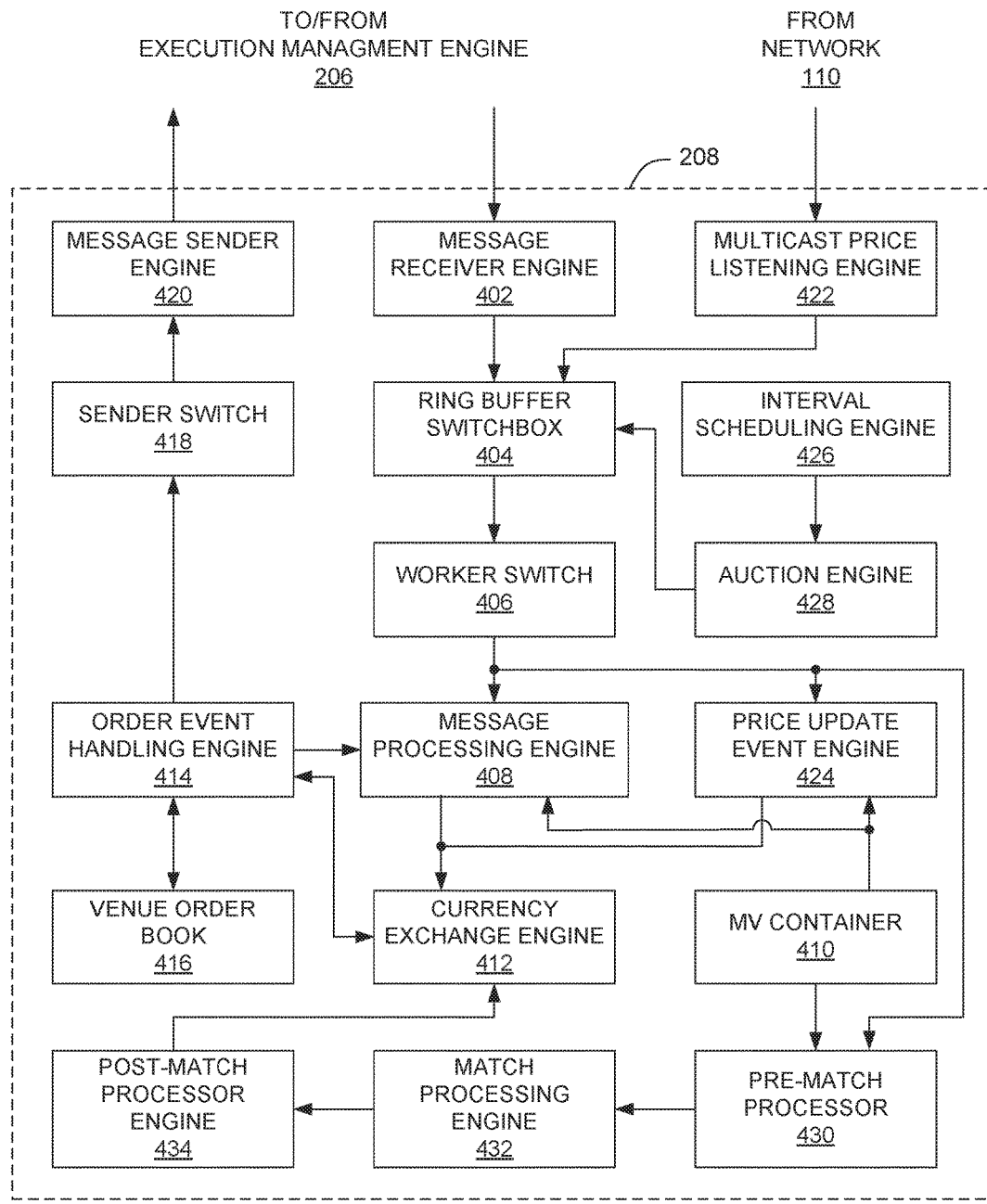
FIG. 4 is a more detailed illustration of the trading venue engine of FIG. 2, according to various embodiments of the present invention.

FIG. 4 is a more detailed illustration of the trading venue engine 208 of FIG. 2, according to various embodiments of the present invention. The trading venue engine 208 includes, without limitation, a message receiver engine 402, a ringbuffer switchbox 404, a worker switch 406, a message processing engine 408, a matching venue (MV) container 410, a currency exchange engine 412, an order event handling engine 414, a venue order book 416, a sender switch 418, a message sender engine 420, a multicast price listening engine 422, a price update event engine 424, an interval scheduling engine 424, an auction engine 428, a pre-match processing engine 430, a match processing engine 432, and a post-match processing engine 434.

The message receiver engine 402 receives encoded order requests from the trading venue dispatch engine 308 of the execution management system 206. The message receiver engine 402 creates a worker event for each received order request. The message receiver engine 402 then queues the worker events by publishing the worker events to the ring buffer switchbox 404.

The ring buffer switchbox 404 assigns a switch to process each worker event based on the venue associated with the corresponding order request and the trading instrument specified by the order request. The ring buffer switchbox 404 assigns switches to worker events in a manner that ensures that a particular order book is processed by a single thread, where an order book is specified by a venue and a trading instrument. The ring buffer switchbox 404 also assigns switches to worker events in a manner that ensures lock-free processing for order requests. As a result, each order book is processed efficiently with very low latency. In addition, the ring buffer switchbox 404 assigns a switch to process worker events received from the multicast price listening engine 422 for updating mid-rates for the various trading instruments processed by the trading venue engine 208. Finally, the ring buffer switchbox 404 assigns a switch to process worker events received from the auction engine 426 to process matches during scheduled match intervals.

The worker switch 406 dispatches worker events to threads for processing. Worker events related to new order requests received from the message receiver engine 402 are assigned to threads and forwarded to the message processing engine 408 for further processing. Worker events related to pricing updates received from the multicast price listening engine 422 are assigned to threads and forwarded to the price update event engine 428 for further processing. Worker events related to matching intervals received from the auction engine 426 are assigned to threads and forwarded to the pre-match processing engine 430 for further processing.

The message processing engine 408 processes worker events related to new order requests received from the message receiver engine 402. The message processing engine 408 decodes the encoded order request and determines the appropriate currency exchange based on the combination of the venue and trading instrument specified by the order request. The message processing engine 408 passes worker events associated with new order requests to the currency exchange engine 412 for further processing.

The MV container 410 receives codes that identify a venue and a trading instrument for a particular worker event. The MV container 410 receives such codes from the message processing engine 408, the price update event engine 428, and the pre-match processing engine 430. In response, the MV container 410 identifies the appropriate currency exchange that maps to the combination of the venue and trading instrument. The MV container 410 then transmits a responsive message that includes the identified currency exchange to the requesting engine.

The currency exchange engine 412 receives worker events from the message processing engine 408, the price update event engine 428, and the pre-match processing engine 430, where each such worker event has been augmented to include the currency exchange corresponding to the particular work event. The currency exchange engine 412 assembles the received worker events and forwards the worker events to the order event handling engine 414.

The order event handling engine 414 validates order requests based on various requirements including, without limitation, the order request meets minimum and maximum order size requirements and the venue corresponding to the order request is open. If the order request is valid, then the order event handling engine 414 records the order request in the venue order book 416. The order event handling engine 414 then prepares an acknowledgment that the order request is accepted and transmits the acknowledgment to the sender switch 418. If the order request is not valid, then the order event handling engine 414 prepares an order rejection and transmits the order rejection to the sender switch 418. During matching intervals, the order event handling engine 414 receives status information regarding which order requests were fully matched, partially matched, and unmatched. The order event handling engine 414 prepares acknowledgements based on the status information and transmits the acknowledgements to the sender switch 418.

The venue order book 416 records all valid order requests and sorts the order requests based on the currency exchange, where the currency exchange is based on the venue and trading instrument associated with each order request. The venue order book 416 is accessed during each trading venue interval to match orders within each currency exchange.

The sender switch 418 receives status information regarding acknowledgements that order requests were received, acknowledgements that order requests were matched, and rejections for order requests that are identified as invalid. The sender switch formats the acknowledgements and rejections into formatted messages for transmitting to the execution management system 206. The sender switch 418 transmits the formatted messages to the message sender engine 420.

The message sender engine 420 receives formatted messages from the sender switch 418 and schedules the formatted messages for transmission to the trading venue message listening engine 310 in the execution management engine 206. In some embodiments, the message sender engine 420 communicates with the execution management engine 206 via a connection/socket based protocol, such as transport control protocol (TCP). In some embodiments, the message sender engine 420 communicates with the execution management engine 206 via a connectionless protocol, such as user datagram (UDP).

The multicast price listening engine 422 electronically receives pricing updates for the various trading instruments that are matched within the trading venue engine 208. The multicast price listening engine 422 receives pricing updates from various sources associated with market exchanges and reporting services. When multicast price listening engine 422 receives a pricing update, the multicast price listening engine 422 determines if the trading instrument associated with the pricing update is associated with any of the currency exchanges within the MV container 410. If the pricing update is not associated with any of the currency exchanges within the MV container 410, then the multicast price listening engine 422 discards the pricing update. If the pricing update is associated with any of the currency exchanges within the MV container 410, then the multicast price listening engine 422 forwards the pricing update. To the ring buffer switchbox 404 for further processing.

The price update event engine 424 processes worker events related to pricing updates received from the multicast price listening engine 422. The price update event engine 424 adjusts the mid-rate price of the trading instrument associated with the pricing update based on previously received data and the new pricing update. In some embodiments, two price update event engines 424 may operate independently to maintain mid-rates for each trading instrument. In such embodiments, one price update event engine 424 may be designated as the primary engine and the other price update event engine 424 may be designated as the secondary engine. The primary price update event engine 424 may supply mid-rates to the trading venue engine 208. If a failure in the primary price update event engine 424, such as when the price update event engine 424 has not updated any mid-rate prices within a threshold amount of time, then the secondary price update event engine 424 may supply mid-rates to the trading venue engine 208. If the primary price update event engine 424 later comes back online, then the primary price update event engine 424 may again supply mid-rates to the trading venue engine 208.

The interval scheduling engine 426 schedules matching intervals for the trading venue engine 208. Such matching intervals are also referred to herein as batches. The duration of each matching interval is configurable and may be any technically feasible time period. In some embodiments, the matching interval duration may be as low as 1 millisecond and as high as twenty-four hours. In some embodiments, each matching interval is 100 milliseconds. By comparison, a continuously matching online trading system may electronically receive, match, and confirm an order request within 200 microseconds of receiving the order request, a time period referred to as the round-trip time. A continuously matching online trading system essentially has a match response time that is equal to the speed of the round-trip time, increasing the likelihood that certain traders can game the online trading system by temporally manipulating market rates. In general, the matching interval duration scheduled by the interval scheduling engine 426 for the trading venue engine 208 is selected to be low enough to provide low latency processing, real-time matching, and confirmation of incoming order requests and, at the same time, long enough, relative to the round-trip time, to reduce or eliminate the likelihood that certain traders can game the online trading system 108.

The interval scheduling engine 426 transmits a signal at the beginning of a first matching interval. This signal causes the auction engine 426 to begin the process of matching the order requests in the venue order book 416. Order requests in the venue order book 416 are matched, and acknowledgements for fully matched, partially matched, and unmatched orders are prepared. New order requests received during the first matching interval are stored for processing in a second matching interval. After the duration of the first matching interval is complete, the interval scheduling engine 426 transmits a signal at the beginning of a second matching interval. This signal causes the auction engine 426 to begin the process of matching any remaining order requests in the venue order book 416 and new order requests received during the first matching interval and posted to the venue order book 416. The process then continues for each subsequent matching interval.

The auction engine 428 performs a batch auction for each matching interval based on the rules for each venue and trading instrument. The auction engine 428 gathers all order requests for a particular matching interval, and forwards the order requests to the ring buffer switchbox 404. The ring buffer switchbox 404 creates worker events for each of the order requests. The worker switch 406 retrieves the worker events and forwards the worker events to the pre-match processing engine 430.

The pre-match processing engine 430 processes worker events related to matching intervals received from the auction engine 426. For each order request to be processed during the match interval, the pre-match processing engine 430 determines whether the venue corresponding to the order request is open and that the mid-rate for the trading instrument specified by the order request is valid. If the venue is closed or the mid-rate is invalid, then the pre-match processing engine 430 either discards the order request or postpones the order request for processing during a subsequent matching interval. If the venue is open and the mid-rate is valid, then the pre-match processing engine 430 forwards the order request to the match processing engine 432.

The match processing engine 432 matches all valid order requests during each matching interval. After performing all possible matches for each order book, the match processing engine prepares messages identifying which order requests, or portions thereof, were filled and at what price. For any partially filled or unfilled order, the match processing engine 432 determines whether the unfilled portion of the order should be cancelled or placed back into the venue order book 416, based on the time in force parameter associated with the order. The match processing engine 432 then forwards the results of the matching interval to the post-match processing engine 434.

The post-match processing engine 434 receives results of each matching interval from the match processing engine 432. The post-match processing engine 434 processes and formats the results, and published a summary of the results along with relevant metrics for the matching interval. The post-match processing engine 436 transmits the results, summary, and metrics to the currency exchange engine 412 for logging and reporting back to the execution management engine 206 via the message sender engine 420.

Figure 5A:
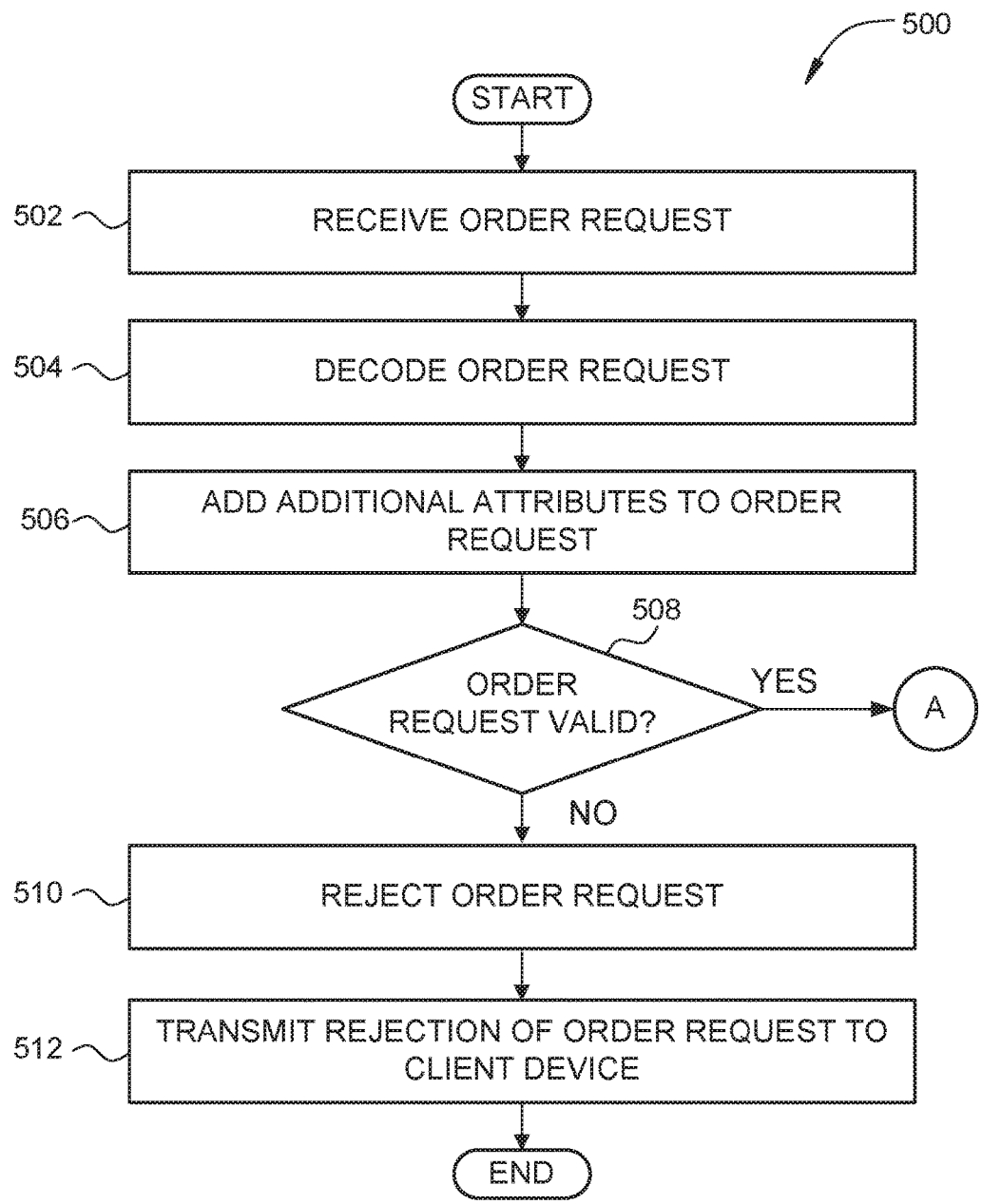
FIGS. 5A-5C set forth a flow diagram of method steps for submitting orders to an execution management engine within an online trading system, according to various embodiments of the present invention.
Figure 5B:
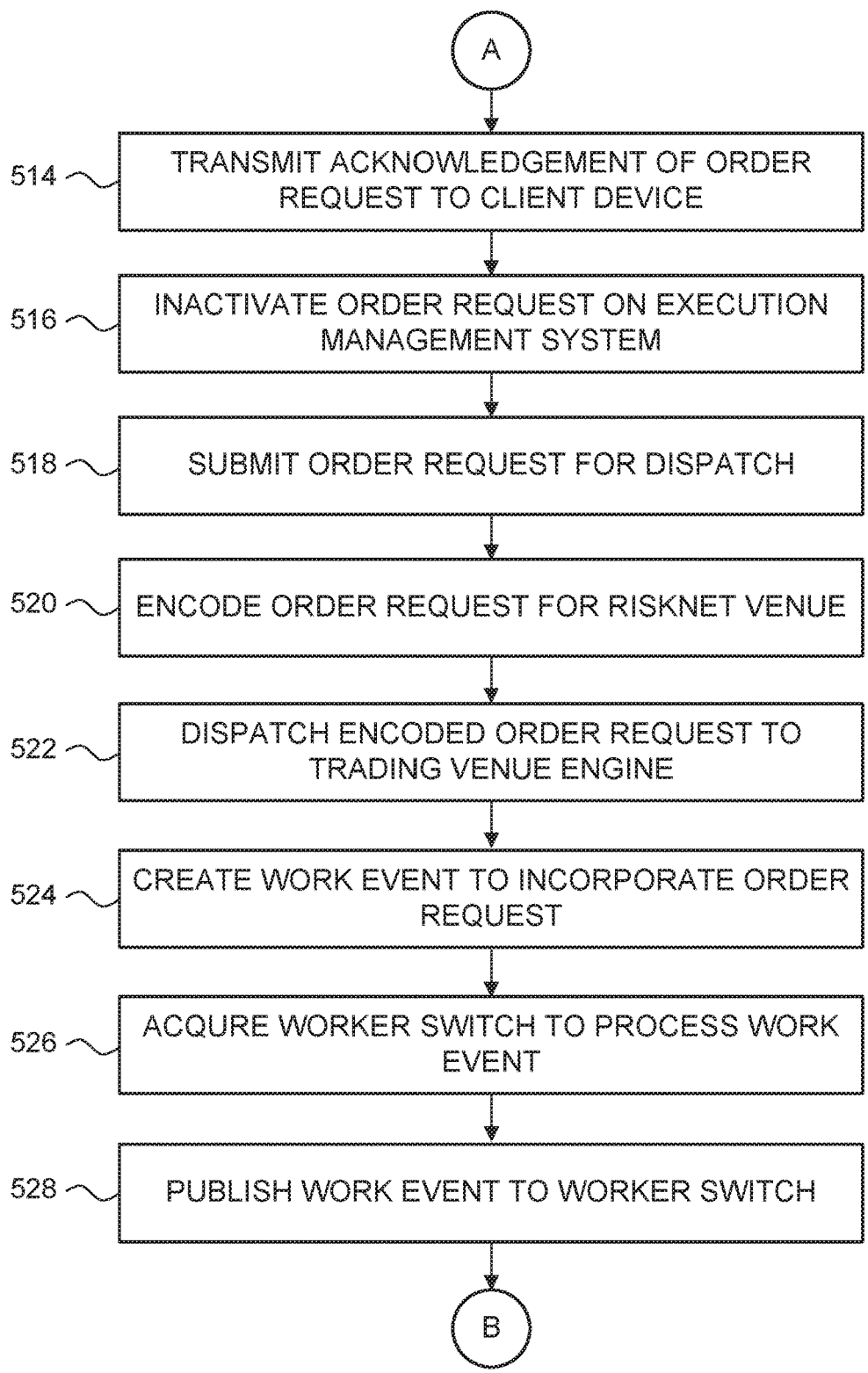
Figure 5C:
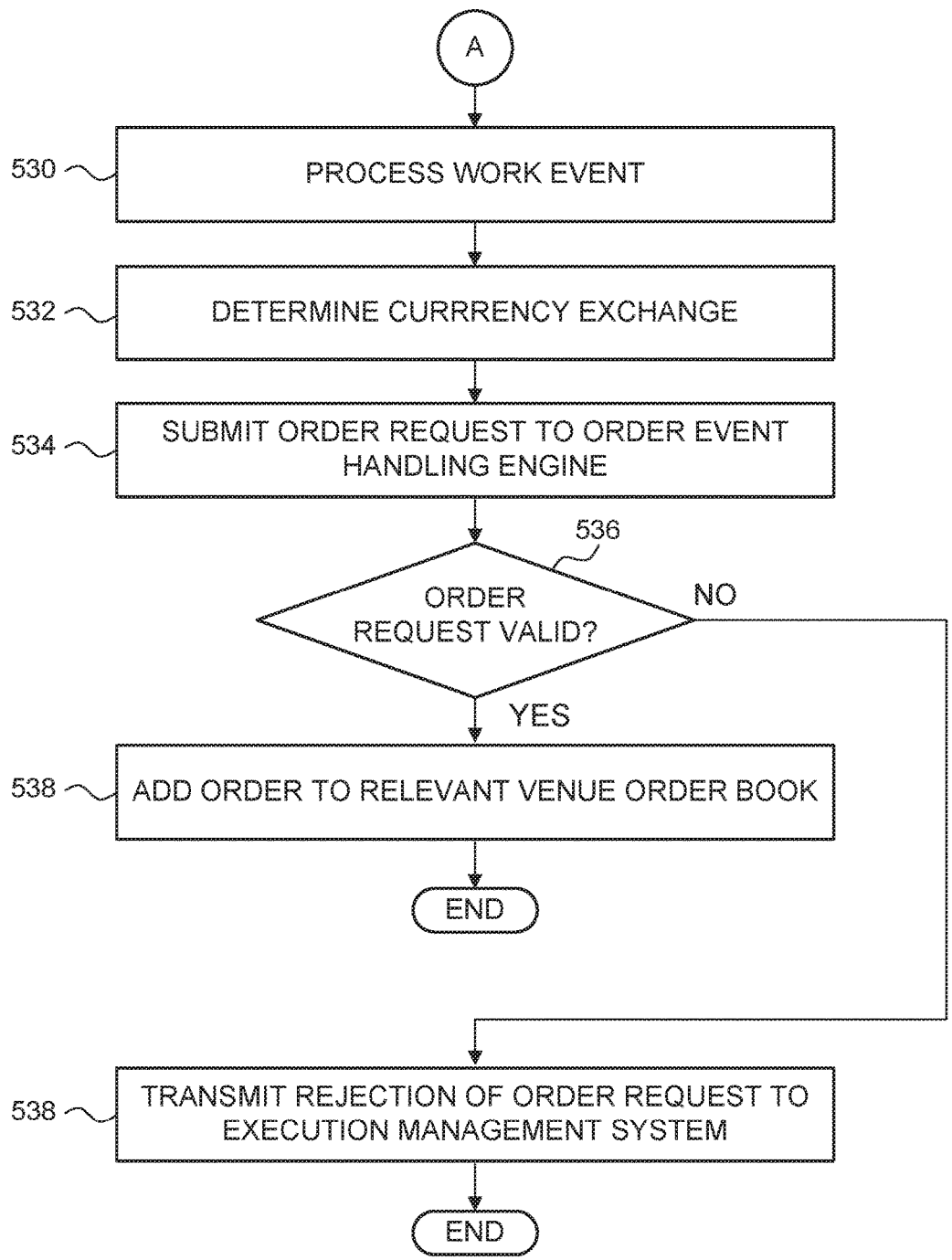

FIGS. 5A-5C set forth a flow diagram of method steps for submitting orders to an execution management engine within an online trading system, according to various embodiments of the present invention. Although the method steps are described in conjunction with the systems of FIGS. 1-4, persons of ordinary skill in the art will understand that any system configured to perform the method steps, in any order, is within the scope of the present disclosure.

As shown, a method 500 begins at step 502, where the client service engine 302 receives an order request. The input parameters include, without limitation, an order type, a strategy, a symbol, an order amount, a "no worse than" price, a time in force, and an action on venue expiry. At step 504, the client service engine 302 decodes the order request based on the UI or API protocol associated with the order request. In so doing, the client service engine 302 extracts input parameters associated with the order request. At step 506, the client service engine 302 adds additional attributes to the order request, including, without limitation, a user name and user organization associated with the order request. At step 508, the order request service engine 302 determines whether the order request is valid. In so doing, the order request service engine 302 determines that mandatory input parameters are present in the order request, that the order request is supported as specified, and that the alphabetic and numerical values are specified correctly. Further, the order request service engine 302 validates the order request based on venue requirements. In so doing, the order request service engine 302 determines that the user is authorized to trade on the requested venue, that the trading venue engine 208 supports the requested order, that the venue is open, and that the user meets credit and order size requirements. If the order request is not valid, then the method proceeds to step 510, where the order request service engine 302 rejects the order request. At step 512, the order response handling engine 312 transmits the rejection of the order request to the corresponding client device 102. The method 500 then terminates.

If, at step 508, the order request is valid, then the method proceeds to step 514, where the order response handling engine 312 transmits an acknowledgment of the order request to the corresponding client device 102. At step 516, the order routing engine 306 inactivates the order request to avoid fulfilling the order request as a standard order within the execution management system 206. At step 518, the order routing engine 306 submits the order request for dispatch to the trading venue engine 208. At step 520, the trading venue dispatch engine 308 encodes the order request into a binary format for fast and efficient transmission to the trading venue engine 208. At step 522, the trading venue dispatch engine 308 dispatches the order request to the message receiver engine 402 of the trading venue engine 208. At step 524, the ring buffer switchbox 404 creates a worker event to incorporate the order request into the relevant venue. At step 526, the ring buffer switchbox 404 acquires a worker switch 406 to process the work event. At step 528, the ring buffer switchbox 404 publishes the worker event to the worker switch 406.

At step 534, the message processing engine 408 processes the work event. The message processing engine 408 decodes the order request to determine the relevant venue and trading instrument for the order request. At step 532, the message processing engine 408 queries the currency exchange engine 412 to determine the currency exchange corresponding to the order request. At step 534, the message processing engine 408 submits the order request to the order event handling engine 414. At step 536, the order event handling engine 414 determines whether the order request is valid based on the relevant venue rules. In so doing, the order event handling engine 414 determines whether the order request meets minimum and maximum order size requirements and verifies that the venue is open. If the order request is valid, then the method proceeds to step 538, where the order event handling engine 414 adds the order request to the relevant venue order book 416. The method 500 then terminates.

If, at step 536, the order request is not valid, then the order event handling engine 414 transmits a rejection to the sender switch 418. The sender switch 418, in turn, formats a rejection message to transmit to the execution management system 206 via the message sender engine 420. The method 500 then terminates.

Figure 6:
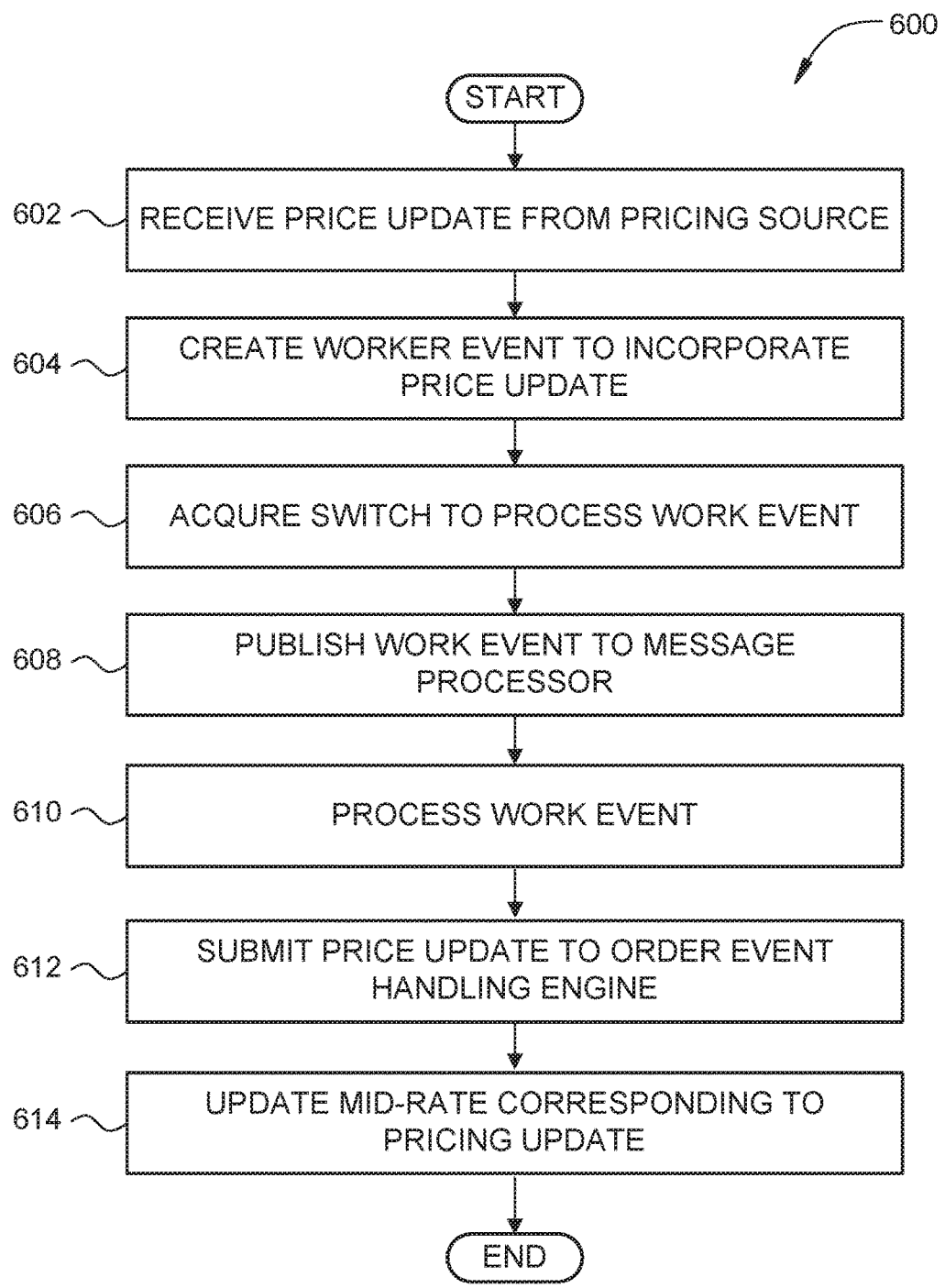
FIG. 6 is a flow diagram of method steps for updating a mid-market price associated with a venue engine within an online trading system, according to various embodiments of the present invention.

FIG. 6 is a flow diagram of method steps for updating a mid-market price associated with a venue engine within an online trading system, according to various embodiments of the present invention. Although the method steps are described in conjunction with the systems of FIGS. 1-4, persons of ordinary skill in the art will understand that any system configured to perform the method steps, in any order, is within the scope of the present disclosure.

As shown, a method 600 begins at step 602, where the multicast price listening engine 422 receives a pricing update in the form of a datagram packet over a multicast socket. At step 604, the multicast price listening engine 422 creates a worker event for the price update event engine 428 to process the pricing update. In some embodiments, the multicast price listening engine 422 creates two worker events for a primary price update event engine 428 and a secondary price update event engine 428 to process the pricing update. The multicast price listening engine 422 queues the worker events in the ring buffer switch box 404. At step 606, the ring buffer switch box 404 acquires a switch to process the worker event. The switch queues worker events for each currency exchange for sequential processing by a single thread. In general, the same thread is used to perform price updates, order request processing, and matching for a particular currency exchange, thereby providing reliable, low latency processing for each currency exchange without the use of resource locks. At step 608, the worker switch 406 publishes the worker event to the message processing engine 408. At step 610, the message processing engine 408 processes the worker event. The message processing engine 408 retrieves the appropriate currency exchange from the MV container 410 that corresponds to the venue and trading instrument associated with the pricing update. At step 612, the message processing engine 408 submits the worker event to the order event handling engine 414. At step 614, the order event handling engine 414 updates the mid-rate corresponding to the pricing update.

The order event handling engine 414 validates the pricing update against certain parameters. For example, the order event handling engine 414 could determine that a price that is zero, negative, or outside a certain range of the current mid-rate is invalid. Further, the order event handling engine 414, in some embodiments, may compare pricing updates received from multiple sources against one another and remove any outlier pricing update that differs from the other received pricing updates, in an effort to lend validity to such pricing updates. If the pricing update is determined to be invalid under any one or more of these tests, the order event handling engine 414 would discard the pricing update. If the order event handling engine 414 determines that the pricing update is valid, then the order event handling engine 414 updates the mid-rate price. In some embodiments, the order event handling engine 414 may update a primary mid-rate price and a secondary mid-rate price based on the pricing update. The method 600 then terminates.

Figure 7:
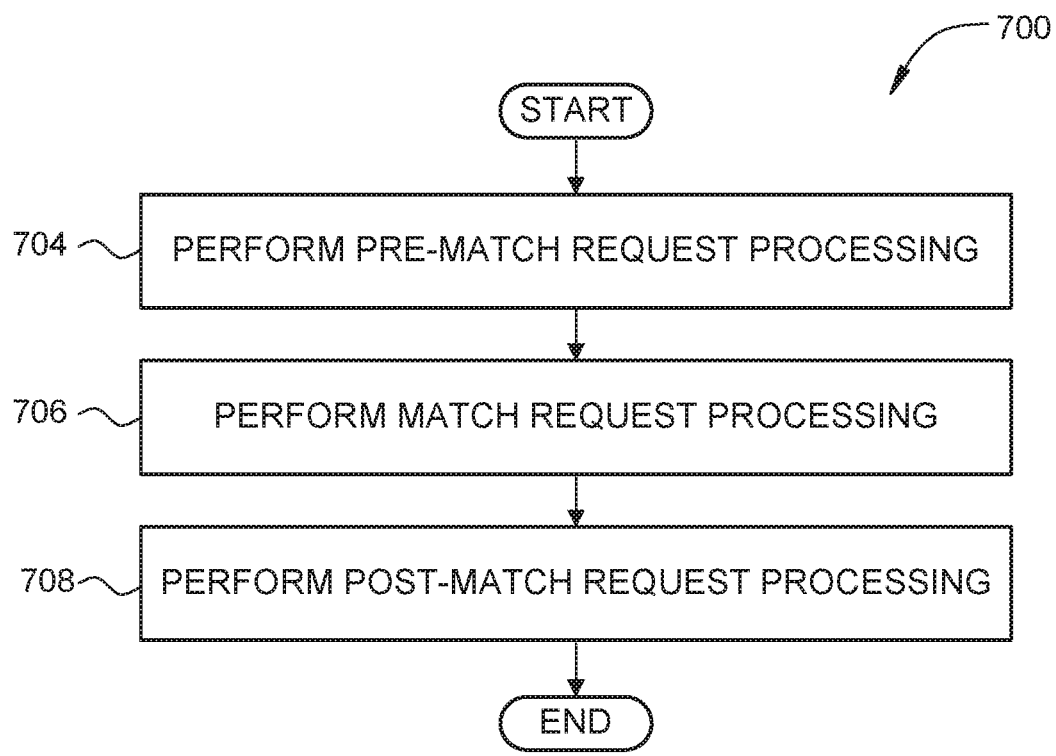
FIG. 7 is a flow diagram of method steps for matching a set of transactions associated with a venue engine within an online trading system, according to various embodiments of the present invention.

FIG. 7 is a flow diagram of method steps for matching a set of transactions associated with a venue engine within an online trading system, according to various embodiments of the present invention. Although the method steps are described in conjunction with the systems of FIGS. 1-4, persons of ordinary skill in the art will understand that any system configured to perform the method steps, in any order, is within the scope of the present disclosure.

As shown, a method 700 begins at step 702, where the pre-match processing engine 430 performs pre-match processing. If matching is already occurring for the currency exchange or if there is no valid mid-rate for the currency exchange, then the pre-match processing engine 430 determines that the matching interval for that currency exchange is invalid. The pre-match processing engine 430 suspends matching for the currency exchange during the current matching interval. If matching is not already occurring and there is a valid mid-rate for the currency exchange, then the pre-match processing engine 430 passes the corresponding order requests to the match processing engine 432.

At step 704, the match processing engine 432 receives the order requests for the current matching interval from the pre-match processing engine 430. For each valid venue order book, the sorts buy and sell orders, and matches sell orders against buy orders. Each venue may have an associated priority scheme to determine the order of processing. In one priority scheme, orders are processed in order from largest to smallest order. In another priority scheme, orders are processed in a priority based on both the size of the order and the age of the order. With this priority scheme, smaller orders that have been unfilled for a number of matching intervals are fulfilled even if larger orders are available for matching. In addition, order requests are sorted in terms of when the order request was received by the online trading system 108. For any given match between two order requests, the order request received earlier is identified as associated with an acting market maker order, regardless of the size of the order. Order requests received later than the acting market maker order for the same instrument are identified as associated with acting market taker orders. Order requests associated with acting market taker orders are then matched against the order request associated with the acting market maker order until the order request associated with the acting market maker order is completely fulfilled.

If a particular order is associated with a no worse than price, then the match processing engine 432 discards the order if the current mid-rate price for the trading instrument does not meet the no worse than price requirement. If an order is matched, then the match processing engine 432 updates the corresponding order book and generates status information for the filled order requests, including the quantity of the instrument that was matched and the mid-rate price at which the order requests were matched. In some embodiments, a fee may be added to the filled order record to charge a fee to one or more the of order requests. If any orders have expired at the end of matching interval, based on the time in force parameter, then the match processing engine 432 generates an order expire response. The match processing engine 432 creates sender events for each filled, partially filled, cancelled, and expired order request. The match processing engine 432 transmits the sender events to the post-match processing engine 434.

At step 704, the post-match processing engine 434 performs post-match processing. The post-match processing engine 434 receives sender events from the match processing engine 432. The post-match processing engine 434 calculates summary information and metrics based on the current matching interval. The post-match processing engine 434 published the summary information and metrics for transmitting to the execution management engine 206. The method 700 then terminates.

In sum, an online trading system employs security mechanisms to reduce or eliminate the likelihood that bad actors can submit order requests that result in unfair gains for such bad actors. The online trading system electronically receives order requests from client devices. For certain types of algorithmic order requests, the online trading system does not immediately attempt to electronically match the order requests against offsetting order requests previously received by the online trading system. Instead, the online trading system includes a timing mechanism that processes electronic order requests in durations of time, referred to as matching intervals. The online trading system receives and stores the electronically received order requests during a portion of a first matching interval without matching any of the trades. Near the end of the matching interval, the online trading system electronically matches the order requests against each other based on the mid-rates assigned to the matching interval. Order requests are electronically matched based on a particular priority scheme, such as order request size or a combination of order request size and age of the order request. The online trading system repeats the interval-based process for subsequent matching intervals.

In addition, the online trading system electronically receives bid and ask pricing updates for various instruments from other various online trading systems and electronic market reporting services. The online trading system analyzes the pricing update to determine whether the pricing update is within a range of values near the current mid-rate price for the instrument. If the pricing update is outside the range of values, then the online trading system discards/filters the pricing update. Further, the online trading system, in some embodiments, may compare pricing updates received from multiple sources against one another and remove any outlier pricing update that differs from the other received pricing updates, in an effort to lend validity to such pricing updates. In this manner, the online trading system accesses a technically reliable source for mid-rate prices and performs additional checks and balances to help ensure that the mid-rates transmitted for matching order requests during matching intervals are reliable and accurate. Further, the online trading system, in some embodiments, may incorporate pricing updates from a time interval that is independent from the matching interval. In this manner, the online trading system can produce a trading rate, or mid-rate, for a particular matching interval that is more resilient and not as affected by short-term pricing changes received by the network, thereby reducing the ability for a sophisticated trader to game the system relative to prior approaches.

At least one advantage of the disclosed techniques is that, by processing order requests at matching intervals rather than immediately, rogue traders cannot take advantage of short duration price changes that occur within the time period of the matching interval. Another advantage of the disclosed techniques is that, by discarding or filtering out of range pricing updates and by delaying incorporation of price updates, abrupt, short term pricing changes either do not affect the mid-rates for a particular matching interval, or are averaged out over a relatively long period of time. As a result, the online trading system is far more secure and less prone to gaming by traders who attempt to electronically manipulate pricing.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computing system for executing a set of transactions, the computer system comprising:
 a memory storing instructions, wherein the memory includes at least one ring buffer; and
 a processor that is coupled to the memory, and when executing the instructions, is configured to:
  receive, from one or more client devices, a first plurality of order requests during a first interval of configurable duration;
  store the first plurality of order requests into the at least one ring buffer;
  assign each order request included in the first plurality of order requests to a separate processing thread included in a plurality of processing threads;
  set a plurality of mid-rate prices corresponding to the first interval;
  determine that the first interval has expired, and
  in response to determining that the first interval has expired, process the plurality of order requests by matching a first order request included in the plurality of order requests with a second order request included in the plurality of order requests, wherein each processing thread included in the plurality of processing threads processes an assigned order request.

2. The computing system of claim 1, wherein, when executing the instructions, the processor is further configured to:
 determine whether the first order request was received earlier within the first interval relative to the second order request; and if the first order request was received prior to the second order request, then designate the first order request as associated with a first acting market maker; or if the first order request was not received prior to the second order request, then designate the second order request as the first acting market maker.

3. The computing system of claim 1, wherein, when executing the instructions, the processor is further configured to:

for each order request in the plurality of order requests, assign the order request to an order book included in a plurality of order books based on an instrument associated with the order request, wherein each order book is configured to be processed by a single processing thread included in the plurality of processing threads.

4. The computing system of claim 3, wherein each order book is configured for processing without resource locks.

5. The computing system of claim 3, wherein, when executing the instructions, the processor is further configured to process the plurality of order books via the plurality of processing threads such that each order book included in the plurality of order books is processed by separate processing threads included in the plurality of processing threads.

6. The computing system of claim 1, wherein, when executing the instructions, the processor is further configured to:

determine that a size of the first order request is within a first range of values; and transmit a message to a first client device included in the one or more client devices indicating that the first order request is valid.

7. The computing system of claim 1, wherein, when executing the instructions, the processor is further configured to:

determine that an order book associated with the first order request is disabled; and transmit a message to a first client device included in the one or more client devices indicating that the first order request is invalid.

8. The computing system of claim 1, wherein, when executing the instructions, the processor is further configured to:

match a first portion of the first order request against the second order request;

determine that a second portion of the first order request has not been matched during the first interval; and transmit, to a first client device included in the one or more client devices, a message indicating that:

the first portion of the first order request has been matched, and the second portion of the first order request has not been matched.

9. The computing system of claim 1, wherein, when executing the instructions, the processor is further configured to:

fail to match a third order request included in the plurality of order requests with any other order request included in the plurality of order requests during the first interval; and cancel the third order request; and transmit, to a first client device included in the one or more client devices, a message indicating that the first order request has not been matched.

10. The computing system of claim 1, wherein when executing the instructions, the processor is further configured to:

fail, during the first interval, to match a third order request included in the plurality of order requests with any other order request included in the plurality of order requests; and submit the third order request to be processed during a second interval of configurable duration.

11. The computing system of claim 1, wherein, when executing the instructions, the processor is further configured to:

receive, via a data source, a price update during the first interval;

modify a first mid-rate based on the price update to generate a second mid-rate;

receive, via one or more client devices, a second plurality of order requests during a second interval of configurable duration;

match the first order request against the second order request at the first mid-rate;

determine that the second interval has expired; and in response, match a third order request included in the second plurality of order requests with a fourth order request included in the second plurality of order requests at the second mid-rate.

12. One or more non-transitory computer-readable storage media including instructions that, when executed by one or more processors, cause the one or more processors to match a set of transactions associated with a networked computer system by performing the steps of:

receiving, by an online trading system, from one or more client devices, a first plurality of order requests during a first interval of configurable duration;

storing, by the online trading system, the first plurality of order requests into at least one ring buffer;

assigning, by the online trading system, each order request included in the first plurality of order requests to a separate processing thread included in a plurality of processing threads;

setting a plurality of mid-rate prices corresponding to the first interval;

determining that the first interval has expired; and in response, processing, by the online trading system, the plurality of order requests by matching a first order request included in the first plurality of order requests with a second order request included in the first plurality of order requests, wherein each processing thread included in the plurality of processing threads processes an assigned order request.

13. The one or more non-transitory computer-readable storage media of claim 12, further comprising instructions that, when executed by the one or more processors, cause the one or more processors to perform the step of, for each order request in the first plurality of order requests, assigning the order request to an order book included in a plurality of order books based on an instrument associated with the order request.

14. The one or more non-transitory computer-readable storage media of claim 13, further comprising instructions that, when executed by the one or more processors, cause the one or more processors to perform the steps of:

assigning a first order book included in the first plurality of order books for processing by a first processing thread included in the plurality of processing threads;

determining that the first processing thread is able to process the first order book and a second order book included in the plurality of order books within a second interval of configurable duration; and assigning the second order book for processing by the first processing thread.

15. The one or more non-transitory computer-readable storage media of claim 13, further comprising instructions that, when executed by the one or more processors, cause the one or more processors to perform the steps of:

assigning a first order book included in the plurality of order books for processing by a first processing thread included in the plurality of processing threads;

determining that the first processing thread is unable to process the first order book and a second order book included in the plurality of order books within a second interval of configurable duration; and assigning the second order book for processing by a second processing thread included in the plurality of processing threads.

16. The one or more non-transitory computer-readable storage media of claim 12, further comprising instructions that, when executed by the one or more processors, cause the one or more processors to perform the steps of:

receiving, from a data source, a price update during the first interval;

modifying a first mid-rate based on the price update to generate a second mid-rate;

matching the first order request against the second order request at the first mid-rate;

receiving, from one or more client devices, a second plurality of order requests during a second interval of configurable duration;

determining that the second interval has expired; and in response, matching a third order request included in the second plurality of order requests with a fourth order request included in the second plurality of order requests at the second mid-rate.

17. The one or more non-transitory computer-readable storage media of claim 12, further comprising instructions that, when executed by the one or more processors, cause the one or more processors to perform the steps of:

receiving, from a data source, a price update associated with at least one of the first order request and the second order request;

determining that the price update is outside of a first range associated with the first mid-rate;

maintaining the first mid-rate; and matching the first order request against the second order request at the first mid-rate.

18. The one or more non-transitory computer-readable storage media of claim 12, further comprising instructions that, when executed by the one or more processors, cause the one or more processors to perform the steps of:

selecting a first mid-rate at which to match order requests included in the first plurality of order requests;

determining that the first mid-rate has not been updated for a threshold period of time;

determining that a second mid-rate has been updated within the threshold period of time; and matching the first order request against the second order request at the second mid-rate rather that at the first mid-rate.

19. A method for executing a set of transactions associated with a networked computer system, the method comprising:

receiving, by an online trading system, from one or more client devices, a first plurality of order requests during a first interval of configurable duration;

storing, by the online trading system, the first plurality of order requests into at least one ring buffer;

assigning, by the online trading system, each order request included in the first plurality of order requests to a separate processing thread included in a plurality of processing threads;

setting a plurality of mid-rate prices corresponding to the first interval;

determining that the first interval has expired; and in response, processing, by the online trading system, the plurality of order requests by matching a first order request included in the plurality of order requests with a second order request included in the plurality of order requests, wherein each processing thread included in the plurality of processing threads processes an assigned order request.

* * * * *

UNITED STATES PATENT AND TRADEMARK OFFICE
CERTIFICATE OF CORRECTION

PATENT NO. : 10,467,696 B1
APPLICATION NO. : 15/224425
DATED : November 5, 2019
INVENTOR(S) : Vikas Srivastava et al.

Page 1 of 1

It is certified that error appears in the above-identified patent and that said Letters Patent is hereby corrected as shown below:

On the Title Page

Item [56], delete "Stonr, Gary: Why is Mid-Point a "Fairer" Price?, May 22, 2014, Bloomberg.com, pp. 1-9. (Year: 2014).*" and insert --Stone, Gary: Why is Mid-Point a "Fairer" Price?, May 22, 2014, Bloomberg.com, pp. 1-9. (Year: 2014).*--;

In the Claims

Column 19, Claim 9, Line 63, delete "and".

Signed and Sealed this
Twenty-fourth Day of March, 2020

Andrei Iancu
*Director of the United States Patent and Trademark Office*